United States Patent
Healey

(10) Patent No.: US 12,330,335 B2
(45) Date of Patent: Jun. 17, 2025

(54) FUSED SILICA TOOLING FOR HIGH TEMPERATURES CERAMIC MATRIX COMPOSITE SINTERING

(71) Applicant: Rolls-Royce plc, London (GB)

(72) Inventor: Adam C. Healey, London (GB)

(73) Assignee: Rolls-Royce plc

(*) Notice: Subject to any disclaimer, the term of this patent is extended or adjusted under 35 U.S.C. 154(b) by 316 days.

(21) Appl. No.: 17/984,781

(22) Filed: Nov. 10, 2022

(65) Prior Publication Data

US 2024/0157601 A1 May 16, 2024

(51) Int. Cl.
| | |
|---|---|
| B28B 7/34 | (2006.01) |
| C01B 33/12 | (2006.01) |
| C04B 35/64 | (2006.01) |
| C04B 35/80 | (2006.01) |

(52) U.S. Cl.
CPC .............. *B28B 7/346* (2013.01); *C01B 33/12* (2013.01); *C04B 35/64* (2013.01); *C04B 35/80* (2013.01); *C04B 2235/656* (2013.01)

(58) Field of Classification Search
CPC . B28B 11/243; B28B 11/248; B28B 23/0006; C01B 33/12; C04B 2235/3217; C04B 2235/522; C04B 2235/6028; C04B 2235/656; C04B 2235/661; C04B 2235/668; C04B 2235/945; C04B 35/01; C04B 35/14; C04B 35/62625; C04B 35/64; C04B 35/80
USPC ............... 156/60, 89.11, 242, 245; 501/95.2; 264/109, 112, 113, 241
See application file for complete search history.

(56) References Cited

U.S. PATENT DOCUMENTS

| | | | |
|---|---|---|---|
| 5,163,498 A | 11/1992 | Kantner et al. | |
| 6,660,115 B2 | 12/2003 | Butler et al. | |
| 6,733,907 B2 | 5/2004 | Morrison et al. | |
| 8,313,598 B2 | 11/2012 | Butler et al. | |
| 8,562,901 B1 | 10/2013 | Mah et al. | |
| 8,863,552 B2 | 10/2014 | Borens et al. | |
| 10,759,702 B2 | 9/2020 | Clark et al. | |
| 11,014,143 B2 | 5/2021 | Satoh et al. | |
| 2002/0197465 A1* | 12/2002 | Butner | C04B 35/634 428/293.4 |
| 2003/0207155 A1* | 11/2003 | Morrison | B32B 18/00 428/699 |
| 2012/0171430 A1* | 7/2012 | Riedell | C04B 35/64 156/289 |

FOREIGN PATENT DOCUMENTS

| | | |
|---|---|---|
| CN | 113945091 | 1/2022 |
| WO | 2014122461 | 8/2014 |

* cited by examiner

*Primary Examiner* — Philip C Tucker
*Assistant Examiner* — Brian R Slawski
(74) *Attorney, Agent, or Firm* — Barnes & Thornburg LLP

(57) ABSTRACT

A method of manufacturing a ceramic matrix composite component includes casting a tool and placing a ceramic matrix composite layup on the tool. The method further includes sintering the ceramic matrix composite layup at a predetermined sintering temperature at atmospheric pressure while the ceramic matrix composite layup is supported on the tool.

20 Claims, 5 Drawing Sheets

FUSED SILICA TOOLING FOR HIGH TEMPERATURES CERAMIC MATRIX COMPOSITE SINTERING

FIELD OF THE DISCLOSURE

The present disclosure relates generally to ceramic matrix composite material components and more specifically to methods of manufacturing ceramic matrix composite components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades.

To this end, some airfoils for vanes and blades, along with other components in the engine are incorporating composite materials adapted to withstand very high temperatures. Design and manufacture of vanes, blades, and other components from composite materials presents challenges because of the geometry and strength required for the parts.

SUMMARY

The present disclosure may comprise one or more of the following features and combinations thereof.

A method of manufacturing a ceramic matrix composite component may include casting a tool comprising fused silica materials, placing a ceramic matrix composite layup on the tool, and performing pressureless sintering to the ceramic matrix composite layup at a predetermined sintering temperature at atmospheric pressure while the ceramic matrix composite layup is supported on the tool. The pressureless sintering may be performed while the ceramic matrix composite layup is supported on the tool so that the heat applied to the ceramic matrix composite layup is evenly distributed across the ceramic matrix composite layup during the pressureless sintering. This may provide the ceramic matrix composite with an increased structural strength compared to other ceramic matrix composite components. In some embodiments, the predetermined sintering temperature may be about 1300 degrees Celsius.

In some embodiments, the step of casting the tool may comprise adding a silica slurry to a mold of the tool, allowing the silica slurry to set for a predetermined cast period to form a silica casting of the tool, demolding the silica casting from the mold after the predetermined cast period, and curing the silica casting to form the tool. In some embodiments, the step of casting the tool may further include vibrating the mold for a predetermined vibration period after adding the silica slurry to the mold.

In some embodiments, the method may further comprise preparing the mold of the tool before casting the tool. The step of preparing the mold of the tool may include assembling and securing inserts on bottom edges of the mold.

In some embodiments, the step of demolding the silica casting from the mold may include removing the inserts. In some embodiments, the step of demolding the silica casting from the mold may include placing prybars to in the areas created by the inserts to assist in removing the silica casting from the mold.

In some embodiments, the step of casting the tool may further include machining the silica casting. The silica casing may be machined to remove excess material after demolding the silica casting.

In some embodiments, the step of curing the silica casting to form the tool may comprises drying the silica casting at room temperature for two days and applying heat at a first predetermined drying temperature to the silica casting for three days after drying the silica casting at room temperature. In some embodiments, the step of curing the silica casting to form the tool may further comprise increasing the temperature of the heat applied to the silica casting to a second predetermined drying temperature for a predetermined heating period after applying heat at the first predetermined drying temperature and applying heat at the second predetermined drying temperature for fifty hours after increasing the temperature to fully cure the silica casting.

In some embodiments, the method may further comprise preparing the mold of the tool before casting the tool. The step of preparing the mold of the tool may include assembling and securing inserts on bottom edges of the mold. In some embodiments, the step of preparing the mold of the tool may further include treating the mold and the inserts with a release agent.

In some embodiments, the tool may be formed to include a first side that contacts the ceramic matrix composite layup and a second side opposite the first side that faces away from the ceramic matrix composite layup. The tool may be formed to include truncated pyramids on the first side of the tool to provide ventilation to the ceramic matrix composite layup to evenly distribute the heat applied to the ceramic matrix composite layup.

In some embodiments, the tool may be formed to include features on the second side of the tool. The features may be configured to increase the surface area of the tool to match the specific heat capacity and thermal conductivity of the tool with the ceramic matrix composite layup.

In some embodiments, the fused silica tool may have a volume to surface area ratio of about 1.5 times larger than that of the ceramic matrix composite layup. The fused silica tool may have a volume to surface area ratio of about 1.5 times larger than that of the ceramic matrix composite layup so that the fused silica tool dissipates heat at the same rate as the ceramic matrix composite layup.

According to another aspect of the present disclosure, a method may comprise treating a mold with a release agent, casting a tool comprising fused silica in the mold, placing a ceramic matrix composite layup on the tool, and sintering the ceramic matrix composite layup at a predetermined sintering temperature. The ceramic matrix composite layup may be while the ceramic matrix composite layup is supported on the fused silica tool so that the heat applied to the ceramic matrix composite layup is evenly distributed across the ceramic matrix composite layup.

In some embodiments, the predetermined sintering temperature may be greater than or equal to about 1200 degrees Celsius. The predetermined sintering temperature may be greater than about 1200 degrees Celsius. The predetermined sintering temperature may be equal to about 1200 degrees Celsius.

In some embodiments, the step of casting the tool may comprise adding a silica slurry to a mold of the tool and vibrating the mold for a predetermined vibration period after adding the silica slurry to the mold. In some embodiments, the step of casting the tool may further comprise allowing the silica slurry to set for a predetermined cast period to form a silica casting of the tool, demolding the silica casting from the mold after the predetermined cast period, and curing the silica casting to form the tool.

In some embodiments, the step of curing the silica casting to form the tool may comprise drying the silica casting at room temperature for two days and applying heat at a first predetermined drying temperature to the silica casting for three days after drying the silica casting at room temperature. In some embodiments, the step of curing the silica casting to form the tool may further comprise increasing the temperature of the heat applied to the silica casting to a second predetermined drying temperature for a predetermined heating period after applying heat at the first predetermined drying temperature and applying heat at the second predetermined drying temperature for fifty hours after increasing the temperature to fully cure the silica casting.

In some embodiments, the tool may have a volume to surface area ratio of about 1.5 times larger than that of the ceramic matrix composite layup. The tool may have a volume to surface area ratio of about 1.5 times larger than that of the ceramic matrix composite layup so that the tool dissipates heat at the same rate as the ceramic matrix composite layup.

In some embodiments, the tool may be formed to include truncated pyramids. The truncated pyramids may be formed on a side of the tool that contacts the ceramic matrix composite layup.

These and other features of the present disclosure will become more apparent from the following description of the illustrative embodiments.

DETAILED DESCRIPTION OF THE DRAWINGS

Figure 1:
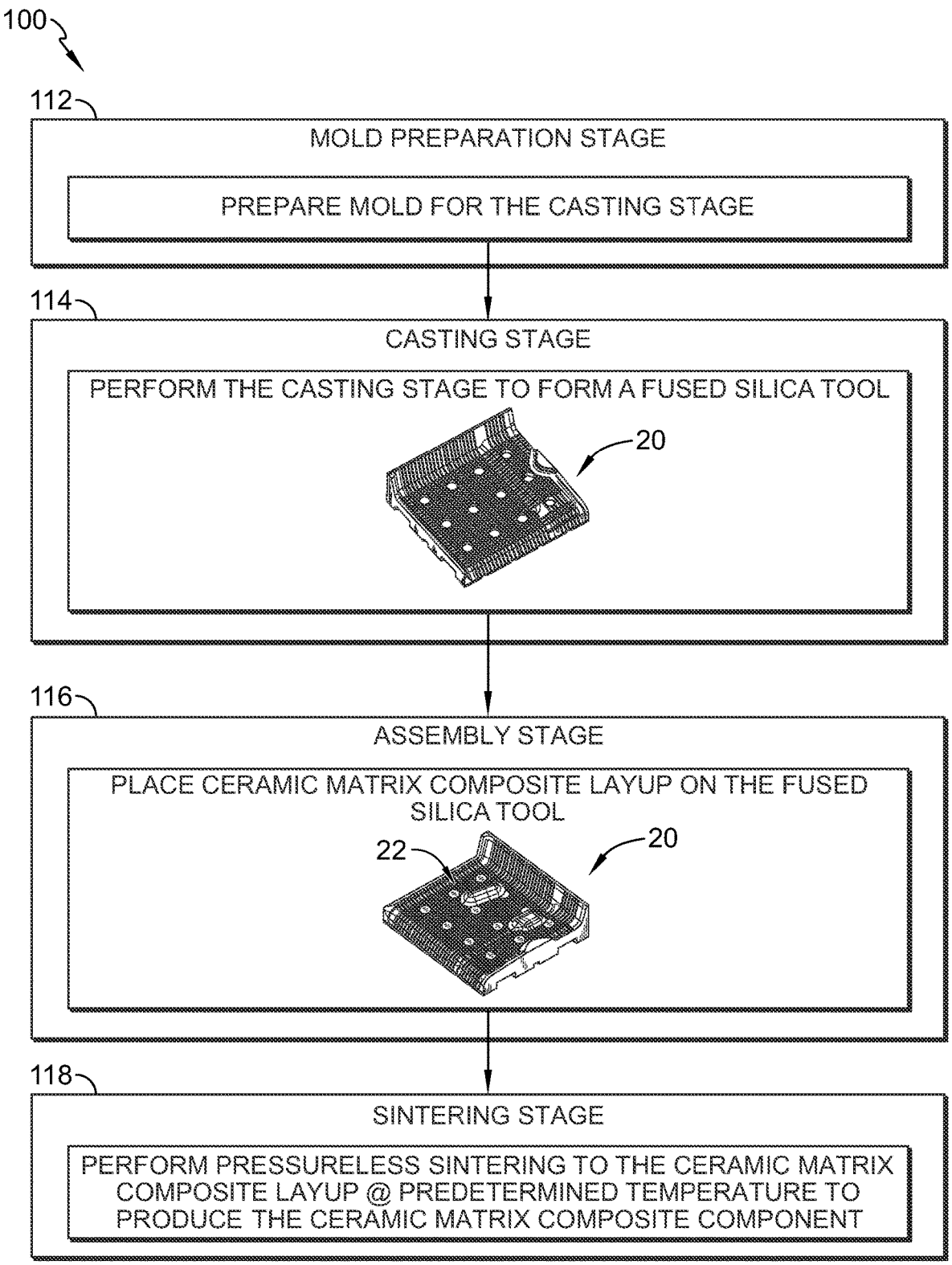
FIG. 1 is a diagrammatic view of a process for forming ceramic matrix composite components showing that the process includes a mold preparation stage to prepare a mold for casting a fused silica tool, a casting stage to form the fused silica tool, an assembly stage to arrange the ceramic matrix composite layup on the fused silica tool, and a pressureless sintering stage to produce a fully formed ceramic matrix composite component.

For the purposes of promoting an understanding of the principles of the disclosure, reference will now be made to a number of illustrative embodiments illustrated in the drawings and specific language will be used to describe the same.

An illustrative process 100 for forming ceramic matrix composite components is shown in FIG. 1. The process 100 includes a mold preparation stage 112 to prepare a mold 12 for casting a fused silica tool 20, a casting stage 114 to form the fused silica tool 20, an assembly stage 116 to arrange the ceramic matrix composite layup 22 on the fused silica tool 20, and a sintering stage 118 as shown in FIG. 1.

The sintering stage 118 includes performing pressureless sintering to the ceramic matrix composite layup 22 at a predetermined sintering temperature at atmospheric pressure, while the ceramic matrix composite layup 22 is supported on the fused silica tool so that the ceramic matrix composite layup 22 has sufficient ventilation. In this way, the heat applied to the ceramic matrix composite layup 22 is evenly distributed across the ceramic matrix composite layup 22 during the pressureless sintering. The even heat distribution provides the ceramic matrix composite with an increased structural strength compared to other ceramic matrix composite components.

Other ceramic matrix composite components that need to be supported during sintering use alumina foam blocks or other similar commercially bought kiln furniture to support the ceramic matrix composite component in the furnace/kiln. In cases where the geometry of the component is large and thin (i.e. heat shields or exhaust components), foam tiles may be unsuitable for sintering because they may be unable to support complex geometries (i.e. curves, pockets, flanges). In some embodiments, the foam tiles may be cemented together to form the needed shape of the support structure, but using high temperature glue capable of surviving the kiln environment results in mismatches in thermal properties between ceramic matrix composite material and glue/cement. This may compromise the integrity of the framework after multiple firings. Further, the multi-piece support structure may have a higher risk of inaccuracy or poor assembly than a single monolithic tooling.

In other embodiments, a bed of refractory powder may be used to support ceramic matrix composite layups with complex geometries. However, the refractory power absorbs a significant amount of heat and takes longer to heat than the ceramic matrix composite material. Additionally, the refractory power retains heat longer than the ceramic matrix composite material, which makes it difficult to control the sintering of the ceramic matrix composite layup.

Ceramic matrix composite components that are processed using one of the above structural supports during the sintering process are relatively brittle. This suggests that the large difference in temperature profile between top and bottom surfaces of the ceramic matrix composite components resulted in a thermal stress gradient through the thickness of the component, likely over-sintering the lower surface. As a result, the component has a reduced ductile failure capability.

The fused silica tool 20 of the present application provides adequate support to the ceramic matrix composite layup 22, while also helping to evenly distribute the heat across the ceramic matrix composite component during the sintering stage 118. Because the tool 20 is made of silica material, the specific heat capacity of the tool 20 is similar to that of the ceramic matrix composite layup 22. Simultaneously, the mass of the tool 20 is significantly greater, which helps increase the strength of the tool 20 to provide support to the ceramic matrix composite layup 22.

In the illustrative embodiment, fused silica tool 20 is a single monolithic component. In other embodiments, the fused silica tool 20 may be produced as multiple blocks, which are subsequently assembled together, as opposed to a single monolithic shape. The multiple block assembly may increase the mass/surface area ratio favorably, while also making the fused silica tool 20 easier to move and handle. The multiple pieces may need a proper tool assembly procedure, using jigs or levels to ensure adequate support. The fused silica tool 20 may be designed such that the multiple pieces are all free-standing, and may not require any cement or glue.

Additionally, the fused silica tool 20 has a volume to surface area ratio of about 1.5 times larger than that of the ceramic matrix composite layup 22. This is because the thermal conductivity of the ceramic matrix composite layup 22 is about 1.5 times that of the fused silica tool 20. The larger volume to surface area ratio of the tool 20 allows the tool 20 to dissipate heat at the same rate as the ceramic matrix composite layup 22, which helps with evenly distributing heat across the layup 22.

Figure 4:
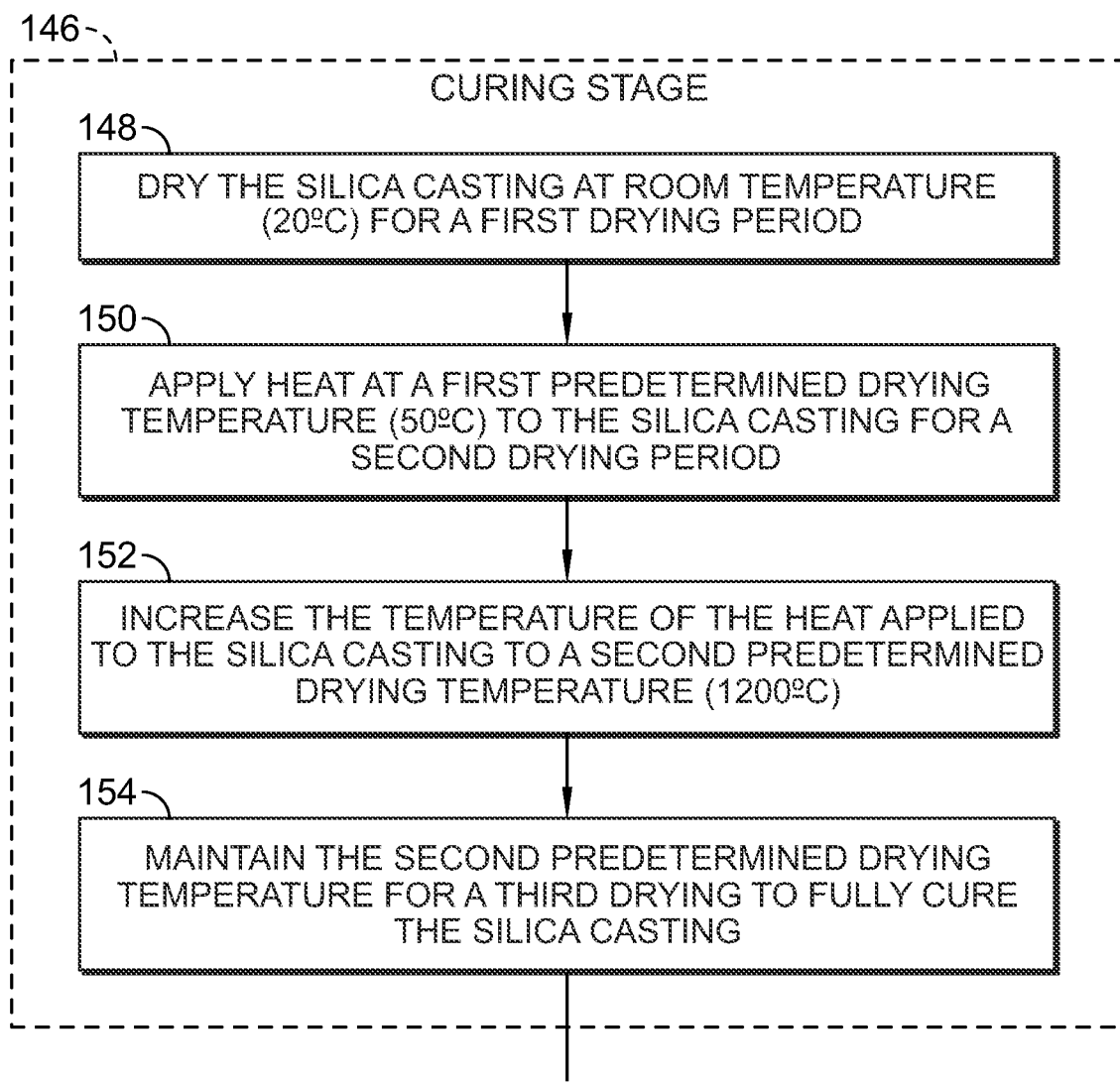
FIG. 4 is a diagrammatic view of the curing stage included in the casting stage of FIG. 3 showing the curing stage includes drying the silica casting at room temperature, applying heat at a first predetermined drying temperature to the silica casting after drying the silica casting at room temperature, increasing the temperature of the heat applied to the silica casting to a second predetermined drying temperature for a predetermined heating period after applying heat at the first predetermined drying temperature, and applying heat at the second predetermined drying temperature after increasing the temperature to fully cure the silica casting.

The fused silica tool 20 is also formed to include truncated pyramids 28 as shown in FIG. 4. The side 24 that faces the ceramic matrix composite layup 22 is formed to include the truncated pyramids 28 to provide ventilation to the ceramic matrix composite layup 22 in contact with the corresponding side 24 of the tool 20.

The other side 26 of the fused silica tool 20 has features to increase the surface area of the tool 20 to match the specific heat capacity and thermal conductivity of the tool 20 with the ceramic matrix composite layup 22. By increasing the surface area of the tool 20, the volume to surface area ratio of the tool 20 is increased. This provides the tool 20 with a similar heating profile compared to the ceramic matrix composite layup 22 to help evenly dissipate the heat across the ceramic matrix composite layup 22.

Figure 5:
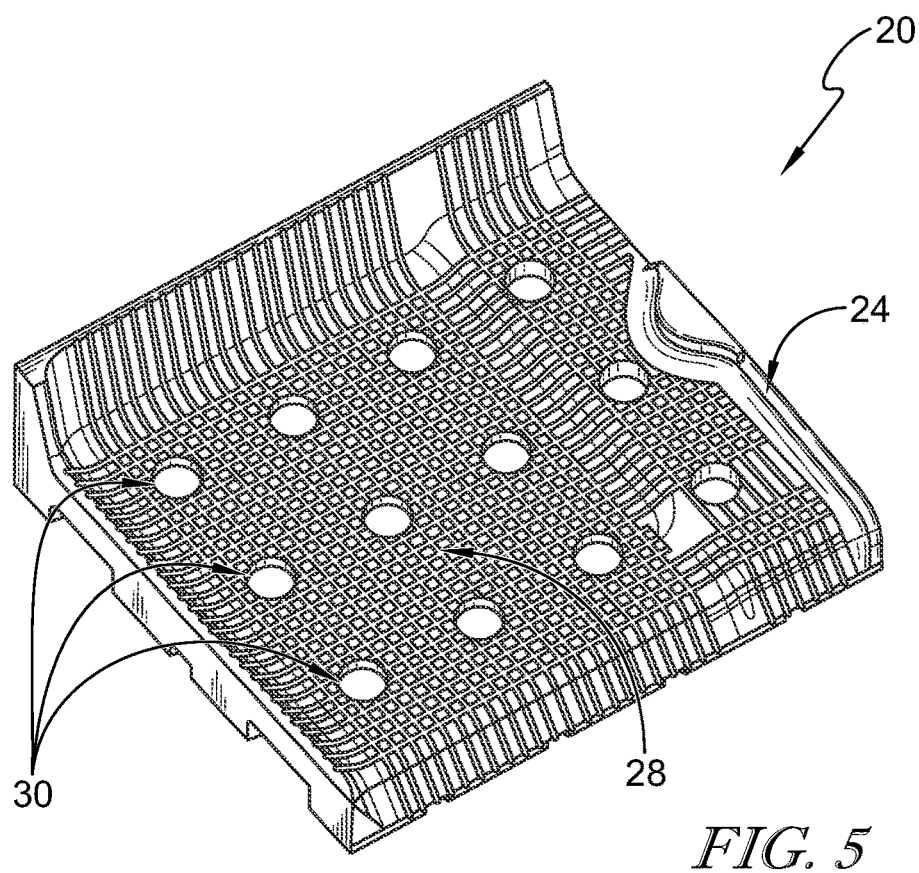
FIG. 5 is a perspective view of the fused silica tool showing the side of the tool configured to face the ceramic matrix composite layup is formed to include truncated pyramids to provide ventilation to the ceramic matrix composite layup in contact with the corresponding side of the tool.
Figure 6:
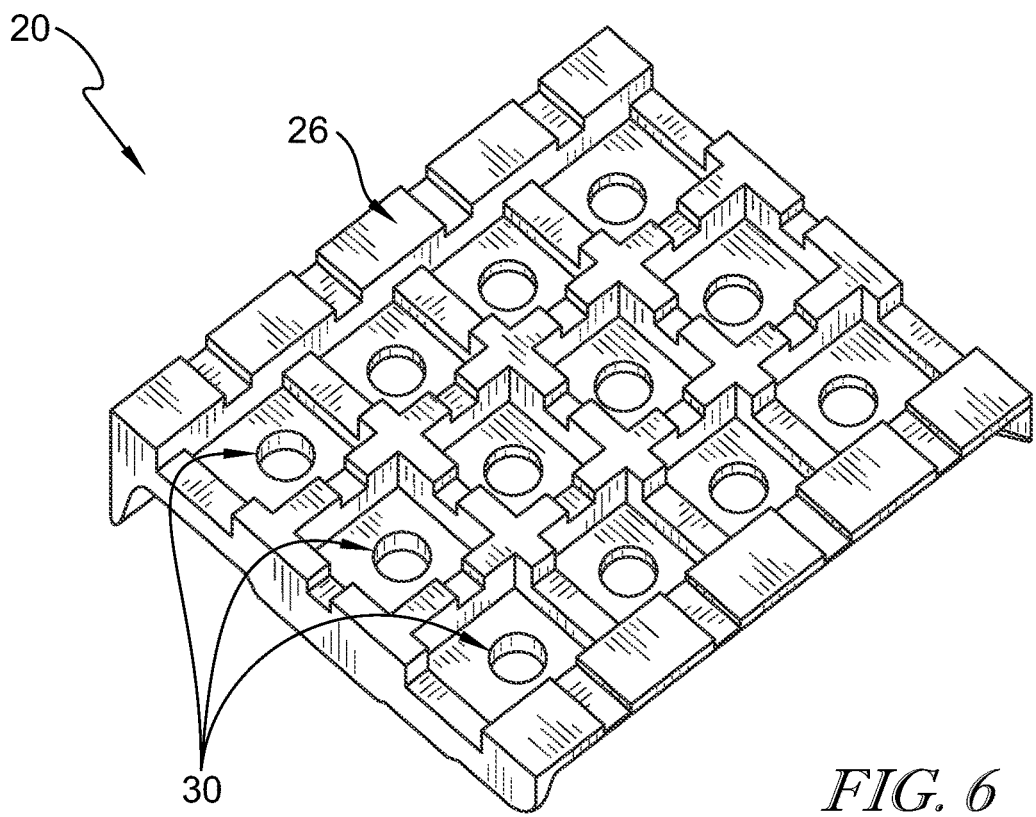
FIG. 6 is a perspective view of the fused silica tool of FIG. 5 showing the other side of the fused silica tool has features to increase the surface area of the tool to match the specific heat capacity and thermal conductivity of the tool with the ceramic matrix composite layup.

The fused silica tool 20 is also formed to include holes 30 as shown in FIGS. 5 and 6. The holes 30 have a taper of at least 3 degrees to assist with demolding. The fused silica tool 20 may also have datum features to assist with layup location on the tool 20.

Figure 2:
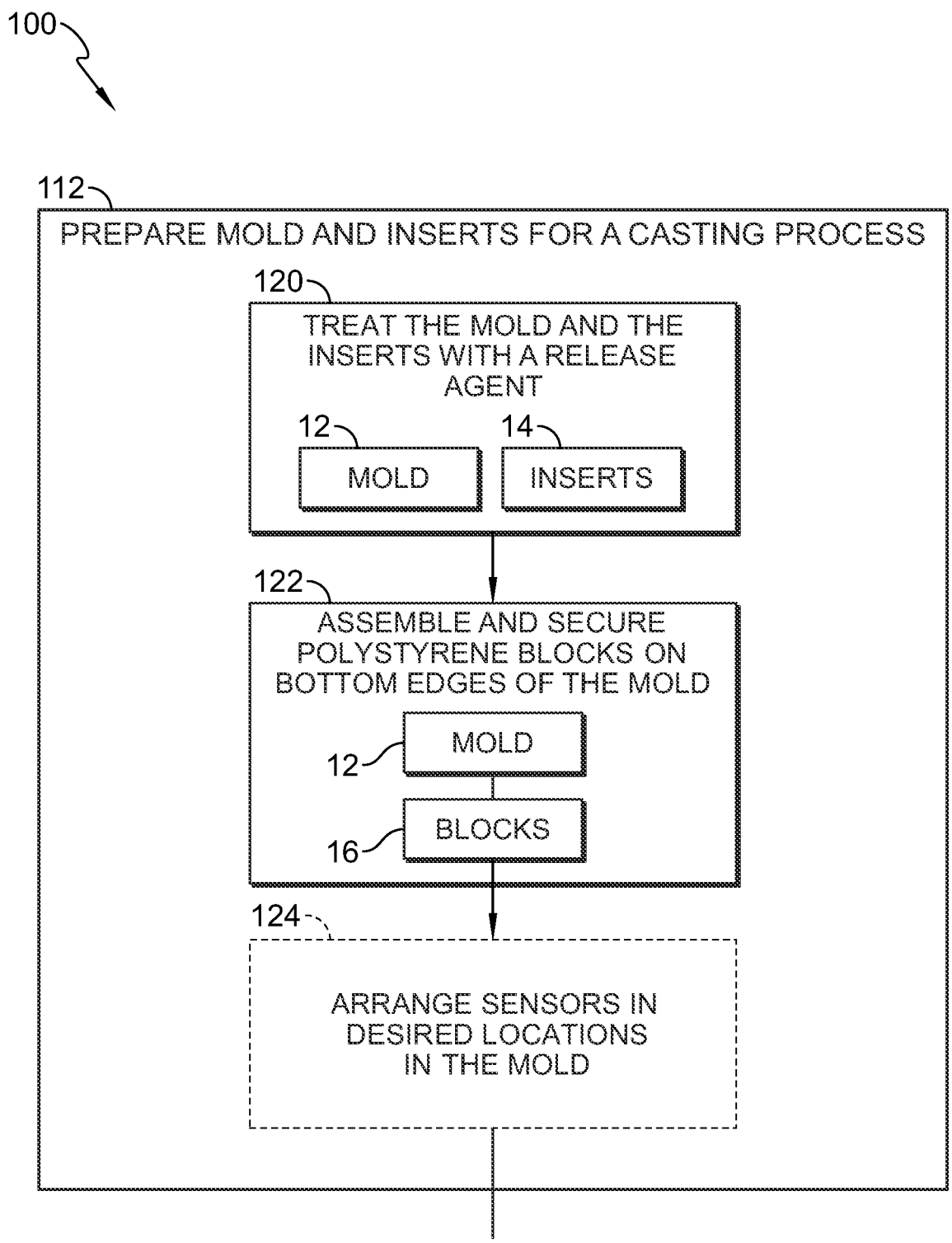
FIG. 2 is diagrammatic view of the mold preparation stage of the process of FIG. 1 showing the mold preparation stage includes treating the mold and corresponding mold inserts with a release agent to assist with demolding, assembling the mold inserts on bottom edges of the mold, and optionally arranging any sensors to be embedded in the final fused silica tool in the mold.

Turning again to the process 100, the mold preparation stage 112 includes treating the mold 12 and inserts 14 with a release agent as suggested by block 120 and assembling and securing polystyrene blocks 16 on the bottom edges of the mold 12 as suggested by block 122 in FIG. 2. The mold 12 and inserts 14 are treated with the release agent to assist with demolding of the silica casting. The inserts 14 are used during the casting stage 114 to displace the silica slurry from areas of the mold 12 to form surface features that may decrease the mass of the resulting tool 20 and/or provide structure to the tool 20. The polystyrene blocks 16 also help with demolding because the blocks 16 may be removed to allow space for prybars or another suitable tool to help demold the silica casting. Because fused silica tool 20 that is formed has increased contact surface area, assistance may be needed to help demold the silica casting and reduce the change of damage to the silica casting during demolding.

In other embodiments, only the release agent is applied and the polystyrene blocks are not used. The release agent may be a composite surface treatment such as frekote. The release agent is to be applied direction to the surface of the mold 12.

In some embodiments, the mold preparation stage 112 further includes arranging sensors in directed locations on the mold 12 as suggested by block 124 in FIG. 2. In this way, during the casting stage 114, the sensors become embedded in the resulting silica casting.

Figure 3:
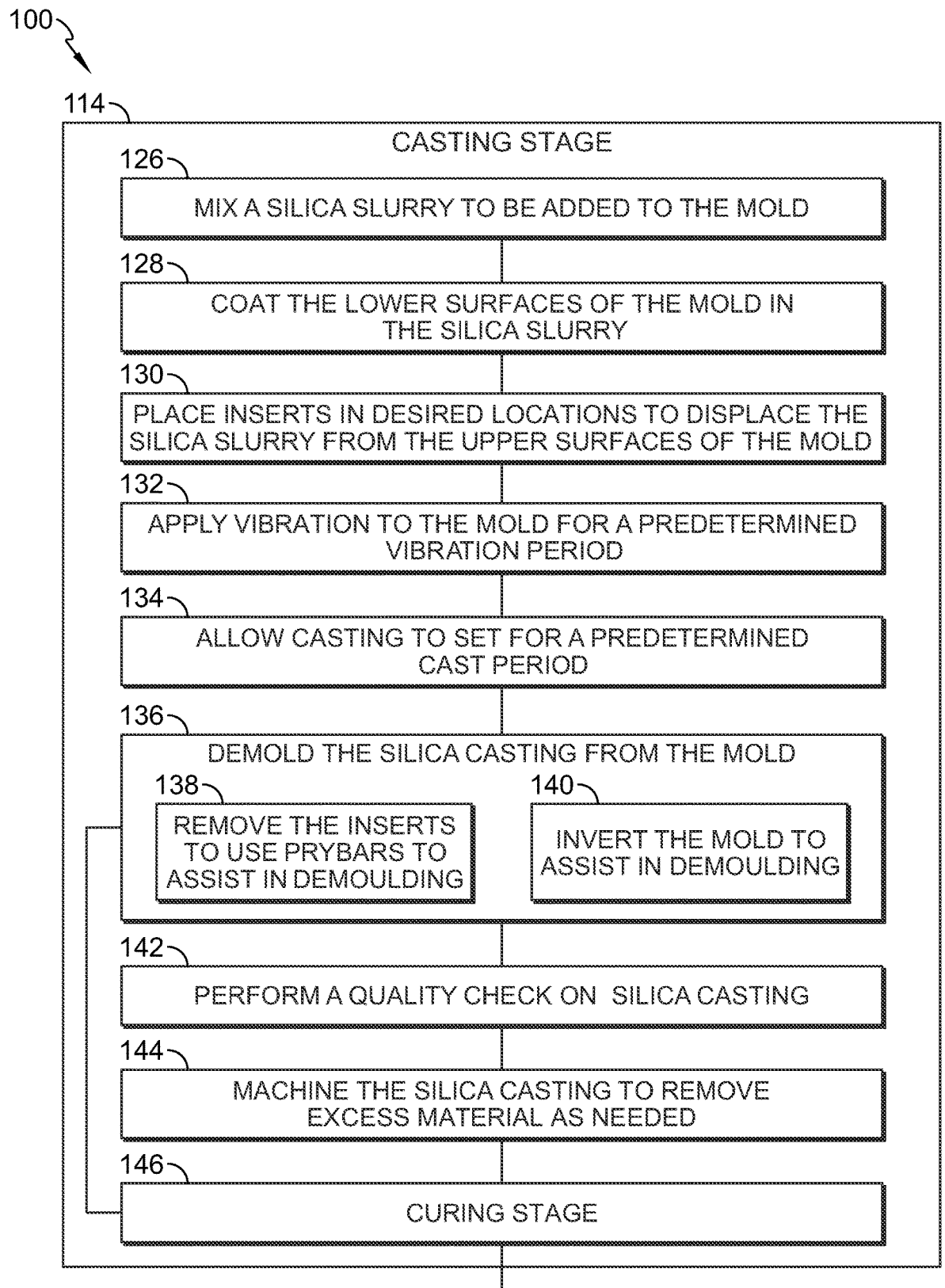
FIG. 3 is a diagrammatic view of the casting stage of the process of FIG. 1 showing the casting stage includes adding a silica slurry to a mold of the tool, vibrating the mold for a predetermined vibration period after adding the silica slurry to the mold, allowing the silica slurry to set for a predetermined cast period to form a silica casting of the tool, demolding the silica casting from the mold after the predetermined cast period, and curing the silica casting to form the tool.

The casting stage 114 begins with mixing a silica slurry to be added the mold 12 as suggested by block 126 in FIG. 3. Before the silica slurry is added to the mold 12, the lower surfaces of the mold 12 are coated in the silica slurry as suggested by block 128. The inserts 14 are then placed in desired locations to displace the silica slurry as suggested by block 130 before additional silica slurry is added to fill the remaining parts of the mold 12.

Once the silica slurry is added to the mold 12, the casting stage 114 further includes applying vibration to the mold 12 as suggested by block 122 in FIG. 3. The silica slurry, when first mixed has a viscous paste consistency, but flows when vibrated because of its thixotropic behavior. The vibration applied to the mold 12 helps the silica slurry take the shape of the mold 12.

The vibration is applied for a predetermined vibration period after the silica slurry is added to the mold 12. If vibration is applied too long, the chemical components of the silica slurry begin to separate out.

The casting stage 114 further includes allowing the silica casting to set for a predetermined cast period in the mold 12 as suggested by block 124 in FIG. 3. After the silica slurry is added, the mold 12 is allowed to set for the predetermined cast period to form the silica casting. The predetermined cast period may be greater than 12 hours.

After the predetermined cast period, the silica casting is demolded as suggested by block 126 in FIG. 3. The demolding may include removing the polystyrene blocks to use prybars to assist in demolding the silica casting as suggested by block 138. Additionally, the mold 12 may be inverted to demold the silica casting as suggested by block 128

Once the silica casting is demolded, the casting stage 114 includes performing a quality check as suggested by block 142 in FIG. 3. If the silica casting fails the quality check, the silica casting may be machined as suggested by block 144. In some embodiments, if the silica casting has excess material, the silica casting may be machined. After the silica casting is machined, the process 100 continues to the curing stage as suggested by block 146 in FIGS. 3 and 4.

The curing stage 146 includes drying the silica casting at room temperature for a first drying period as suggested by block 148 in FIG. 4. The room temperature is about 20 degrees Celsius. The first drying period is about equal to or greater than two days.

After the first drying period, the curing stage 146 includes applying heat at a first predetermined drying temperature to the silica casting for a second drying period as suggested by block 150 in FIG. 4. The first predetermined drying temperature is about 50 degrees Celsius. The second drying period is about equal to or greater than three days.

After the second drying period, the temperature of the heat applied to the silica casting is increased to a second predetermined drying temperature as suggested by block 152 in FIG. 4. The second predetermined drying temperature is about 1200 degrees Celsius.

The second predetermined drying temperature is then maintained for a third drying period to fully cure the silica casting as suggested by block 154. After the third drying period, the fused silica tool 20 is fully formed and can be used in the sintering stage 118.

Before the sintering stage 118, the ceramic matrix composite layup 22 is arranged on the fused silica tool 20 as suggested by block 116. The fused silica tool 20 provides adequate support to the ceramic matrix composite layup 22, while also helping to evenly distribute the heat across the ceramic matrix composite component during the sintering stage 118. Because the tool 20 is made of silica material, the specific heat capacity of the tool 20 is similar to that of the ceramic matrix composite layup 22. Simultaneously, the mass of the tool 20 is significantly greater, which helps increase the strength of the tool 20 to provide support to the ceramic matrix composite layup 22.

Once arranged on the tool 20, the process 100 continues to the sintering stage 118 as shown in FIG. 1. The sintering stage 118 includes performing pressureless sintering to the ceramic matrix composite layup 22 at the predetermined sintering temperature to produce a fully formed ceramic matrix composite component. The predetermined sintering temperature is between about 1200 degrees Celsius and 1300 degrees Celsius. In some embodiments, the predetermined sintering temperature is about 1200 degrees Celsius. In other embodiments, the predetermined sintering temperature may be greater than 1200 degrees Celsius. In the illustrative embodiment, the predetermined sintering temperature is about 1300 degrees Celsius.

In some embodiments, the tool 20 may used in debulking or consolidation of the ceramic matrix composite layup 22 like as described in U.S. application Ser. No. 17/984,579, filed Nov. 10, 2022, titled "METHOD OF USING PERMEABLE MEMBRANE IN THE DEBULKING OF CMC PREPREG MATERIAL;" U.S. application Ser. No. 17/984,584, filed Nov. 10, 2022, titled "METHOD OF DEBULKING OF CERAMIC MATRIX COMPOSITE PREPREG MATERIAL;" and U.S. application Ser. No. 17/984,589, filed Nov. 10, 2022, titled "MULTI-STAGE CONSOLIDATION PROCESS FOR CERAMIC MATRIX COMPOSITE PREPREG MATERIAL," which are hereby incorporated herein by reference in its entirety for its disclosure relative to the debulking or consolidation processes of the ceramic matrix composite layup.

The process 100 includes supporting oxide/oxide ceramic matrix composite (CMC) components during the high temperature sintering process with fused silica tooling 20. The fused silica tool 20 provides both adequate support to the ceramic matrix composite and sufficient ventilation to ensure even heat distribution. Other support apparatuses like alumina foam or alumina powder may provide inadequate support and thus produce components with reduced mechanical properties and variation in appearance. The fused silica cement is a zero-expansion setter for ceramic matrix composite support.

The process 100 produces ceramic matrix composite component from Ox-Ox CMC prepreg material. The components may be exhaust components and/or heatshields.

There may be various methods to support components in furnaces/kilns, depending on the component. For example, small ceramic matrix composite components with simple geometry (e.g. flat plates, single radius bends) may be sintered upon alumina foam blocks, or similarly commercially bought kiln furniture. Larger ceramic matrix composite components with suitably stiff geometry (e.g. exhaust mixers) may be free-standing.

However, larger components with thin, non-stiff geometry (e.g. heat shields, exhaust components), may need additional support. Foam tiles are unsuitable for sintering as, while adequate for the flat areas, are unable to support curves, pockets or flanges without machining and/or gluing a framework together.

In other embodiments, support structures may be made from multiple shapes that are cemented together. Due to the brittle nature, machining processes weaken refractory materials, and introducing high temperature glue capable of surviving the kiln environment results in mismatches in thermal properties between substrate and glue/cement. This may cause damaging stress top the support that compromise the integrity of the support after multiple firings. Further, a structure made of multiple components may have a greater risk of inaccuracy or poor assembly than a single monolithic tooling.

In other embodiments, a bed of refractory powder may be used to support complex geometries. This may provide adequate support to the structure. However, a large mass of refractory powder absorbs a significant amount of heat energy. As a result, the powder is slower to heat than the ceramic matrix composite component and retains that heat for long after the source is taken away (over 200 degrees Celsius difference between ceramic matrix composite component and powder support depending on the sintering cycle).

Mechanical testing of components processed in this way showed that the components had ⅓ of the flexural strength of foam-sintered ceramic matrix composite components, and had more brittle failure mechanisms. This suggests that the large difference in temperature profile between top and bottom surfaces of the ceramic matrix composite component resulted in a thermal stress gradient through the thickness, likely over-sintering the lower surface and removing ductile failure capability.

Other supports, like kiln furniture, may provide a suitable solution from a materials perspective, but the geometries available are intended for mass production of small, simple geometries (e.g. plates, dishes). Therefore, kiln furniture may not provide adequate support for large, complex ceramic matrix composite components.

Fused silica cement has a near-zero coefficient of thermal expansion and is resistant to chemical change (e.g. oxidation) up to 1280 degrees Celsius, which provides ideal properties for use at high temperature. Further, fused silica cement may be manufactured using a casting process. Therefore, any geometry is theoretically possible provided a suitable cast mold can be manufactured. This is pertinent to designing a suitable surface for the ceramic matrix composite layup to be in contact with such that the over-sintering issues, like those encountered using powder are avoided.

Furthermore, a single tooling may be manufactured as a monolithic component, as opposed to other solutions that might employ multiple structures to form a framework and risk deformation in the CMC from tooling misalignment. This may also offer increased accuracy.

The material uses a combination of alumina cement, silica particles of various size, and water. The present application relates to the cast fused silica tooling 20 used to support ceramic matrix composite components during pressureless sintering at high temperatures (up to 1300 degrees Celsius).

The tool 20 has features that provide structural strength to support the ceramic matrix composite layup 22. The tool 20 has a low contact surface area (<60%) with the ceramic matrix composite layup 22 to allow adequate ventilation and provide an evenly distributed heating profile.

The tool 20 also has features to match the overall surface profile to that of the complex ceramic matrix composite component, while also providing a surface profile with a low contact surface area. The tool 20 also has part location datum features.

The tool 20 also have a near-zero coefficient of thermal expansion that is similar to the ceramic matrix composite layup 22. The geometric features of the tool 20 accommodate lifting/moving (e.g. forklift slots) and demolding from mold once cast (e.g. pry-bar slots, surface treatment).

The tool 20 also have a volume-to-surface area ratio that, combined with specific heat capacity and thermal conductivity, provides a heating profile similar to that of the ceramic matrix composite component The tool 20 also has a minimal weight to aid lifting. This would also allow the tool 20 to be placed on a turntable to allow it to be rotated in the kiln to achieve a more even temperature distribution. Even thermal survey is a greater challenge for larger kilns required for larger parts.

The specific heat capacity of the fused silica tool 20 is very similar to that of the ceramic matrix composite, but the mass is significantly greater. While the density of the two materials is similar (2.2-2.9 g cm$^{-3}$), the fused silica tool 20 will have more mass to provide structural strength. Further, the thermal conductivity of the ox/ox ceramic matrix composite is approximately 1.5 times that of the fused silica. Therefore, in order to dissipate heat at the same rate, the tool 20 has a volume/surface area ratio at least 1.5 times larger than that of the ceramic matrix composite.

An illustrative fused silica tool 20 is shown in FIGS. 5 and 6. The tool 20 is formed to include truncated pyramids 28 in the surface 24 in contact with the ceramic matrix composite. All the features, such as the holes 30, have a taper of at least 3 degrees to assist with demolding. The cast mold features removable inserts that allow access for pry-bars to assist with demolding. The underside 26 of the tool 20 has increased surface area to have the desired volume to surface area ratio. Some features of the ceramic matrix composite layup, such as the pockets and side flange, may not be supported, as their structural stiffness does not allow deformation.

The mold material may be blue-block as it has been found to be effective due to machinability, though its stiffness may not help with demolding and casting of certain features. For example, if there are holes to be cast in the tool 20, this is a likely site of crack formation due to hoop stresses; therefore, it is recommended that a flexible layer be applied to such features prior to casting.

In some detachable features may be made out of flexible material. If these come away with the silica casting during demolding, the detachable features may be removed from the cast surface provided they have been surface-treated.

In some embodiments, the mold 12 is attached to a shaker table to vibrate the mold 12. The provides good vibrational transfer from the shaker table, to the mold 12, and then to silica casting. This has historically been achieved by incorporating 'feet' to the mold 12, which may be fixed to the shaker table using ratchet straps.

The mold 12 may be pre-treated to help with demolding. Additionally, it has been found that, when combined with surface pre-treatment, inverting the mold 12 may help at facilitating demolding. Provisions may be made in the mold design (i.e. lifting bolts, lifting chain attachments) to accommodate this.

If the silica tool 20 is to carry out functions as well as high-temperature support of the ceramic matrix composite component, for example allowing process control through thermocouples, then design of the mold should be altered to ensure this. Other features may include consistency checks by way of slots for Buller's rings, which may expand to a consistent extent depending on the amount of thermal energy they have been subjected to. A hole/slot may be cast in the tooling with a known/target size. If the Buller ring is placed in prior to sintering of the tool and cannot be removed after firing due to over-expansion, this would indicate over-sintering.

Manufacturing of the tool 20 may be carried out using a casting process 114 combined with agitation via shaker table. Prior to casting, the mold 12 (and any inserts 14) may be treated with mold release agent. Additionally, small polystyrene blocks 16 placed at the bottom edges of the mold 12 prior to casting may assist with demolding. After casting, the polystyrene may be removed to allow space for pry-bars between the cast silica and the mold 12.

Due to the high contact surface area produced, such capability helps ease demolding and reduce the chance of damage being induced. However, these polystyrene blocks, if not adequately secured, may be shaken loose and float into the silica, creating voids which are detrimental to the structural integrity after setting/firing. The use of composite surface treatment (e.g. Frekote) directly to the surface of the mold may help facilitate demolding after casting, more so than polystyrene blocks.

When first mixed, the silica material has a viscous paste texture. However, due to thixotropic behavior, the silica material flows when vibrated to assume the shape of the mold it is cast into. Once the lower surfaces of the mold have been coated with the silica material, inserts may be used to displace silica from upper surfaces, forming surface features that may decrease mass and/or provide structure.

Agitation is applied for a predetermined vibration period. The vibration may only be applied for a short period; otherwise, the chemical components of the silica slurry may begin to separate out. Further, silica batch volume and quality control should be employed to ensure that silica does not dry out in the bucket before it can applied, and on the mold before the next layer can be applied. Differences in mix quality and quantity can result in layer interfaces. Historically, 50 kg has shown to be a good amount of silica to mix at a time, though depending on the mixing equipment available and mixer/mold carriage this can change.

Once cast, the silica material is allowed to set overnight (>12 hours). The cast tooling is then demolded. The demolding step 136 may differ depending on the design. The demolding may include a combination of surface pre-treatment on the mold, polystyrene blocks tactically cast to allow access for pry-bars, and inverting the mold to let gravity assist. After demolding, quality checks (e.g. metrology) may be carried out.

The silica casting is then subjected to drying in order to remove excess water. Depending on the size, this stage can be lengthy. The curing stage 146 includes drying at room temperature (20 degrees Celsius) dry for two days (>48 hours), followed by an elevated temperature cure at 50 degrees Celsius for three days (>72 hours). It is then finally fired to over the intended operating temperature at a very slow temperature ramp rate. The intended operating temperature was 1150 degrees Celsius, so the tooling was fired up to 1200 degrees Celsius to ensure no adverse effects would occur during operation. The tooling was kept at this temperature for 50 hours. The total time for manufacture, including cast and curing stages, was approximately two weeks. Once the high temperature fire is complete, the tooling is ready for service.

For smaller tools 20, this curing time may be reduced as there is less moisture to remove, but caution should be used if drying too fast. One of the adverse effects mentioned earlier is the tool 20 may be structurally damaged if it dried too quickly too soon, as moisture tries to escape.

The cast may be machined to remove erroneous features (e.g. cast over-fill) or to adjust the final component. If machining is needed, angle grinders and chisels may be used to shape the material. This should be done before kiln drying stages as the material brittleness only increases over time as water is removed. At the end-of-life, the silica material may be broken down into fragments and recycled as abrasive or grinding media.

Advantages are repeatable high temperature processing of thin ox-ox ceramic matrix composite components of complex geometry that would otherwise deform under their own weight. This is achieved with complex shape casting manufacture and engineered surface of the tool 20, which also allows processing to occur with an even heat distribution throughout the ceramic matrix composite component that would otherwise degrade mechanical performance.

For the purposes of the present disclosure, the modifier about means±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of manufacturing a ceramic matrix composite component, the method comprising
    casting a tool comprising fused silica materials,
    placing a ceramic matrix composite layup on the tool, and
    performing pressureless sintering to the ceramic matrix composite layup at a predetermined sintering temperature at atmospheric pressure while the ceramic matrix composite layup is supported on the tool so that heat applied to the ceramic matrix composite layup is evenly distributed across the ceramic matrix composite layup during the pressureless sintering.

2. The method of claim 1, wherein the predetermined sintering temperature is about 1300 degrees Celsius.

3. The method of claim 1, wherein the step of casting the tool comprises:
    adding a silica slurry to a mold of the tool,
    allowing the silica slurry to set for a predetermined cast period to form a silica casting of the tool,
    demolding the silica casting from the mold after the predetermined cast period, and
    curing the silica casting to form the tool.

4. The method of claim 3, wherein the step of casting the tool further includes vibrating the mold for a predetermined vibration period after adding the silica slurry to the mold.

5. The method of claim 3, further comprising preparing the mold of the tool before casting the tool, wherein the step of preparing the mold of the tool includes assembling and securing inserts on bottom edges of the mold.

6. The method of claim 5, wherein the step of demolding the silica casting from the mold includes removing the inserts and placing prybars in areas created by the inserts to assist in removing the silica casting from the mold.

7. The method of claim 3, wherein the step of casting the tool further includes machining the silica casting to remove excess material after demolding the silica casting.

8. The method of claim 3, wherein the step of curing the silica casting to form the tool comprises:
    drying the silica casting at room temperature for two days,
    applying heat at a first predetermined drying temperature to the silica casting for three days after drying the silica casting at room temperature,
    increasing the temperature of the heat applied to the silica casting to a second predetermined drying temperature for a predetermined heating period after applying heat at the first predetermined drying temperature, and
    applying heat at the second predetermined drying temperature for fifty hours after increasing the temperature to fully cure the silica casting.

9. The method of claim 8, further comprising preparing the mold of the tool before casting the tool, wherein the step of preparing the mold of the tool includes assembling and securing inserts on bottom edges of the mold.

10. The method of claim 9, wherein the step of preparing the mold of the tool further includes treating the mold and the inserts with a release agent.

11. The method of claim 1, wherein the tool is formed to include a first side that contacts the ceramic matrix composite layup and a second side opposite the first side that faces away from the ceramic matrix composite layup, and wherein the tool is formed to include truncated pyramids on the first side of the tool to provide ventilation to the ceramic matrix composite layup to evenly distribute the heat applied to the ceramic matrix composite layup.

12. The method of claim 11, wherein the tool is formed to include features on the second side of the tool configured to increase the surface area of the tool to match the specific heat capacity and thermal conductivity of the tool with the ceramic matrix composite layup.

13. The method of claim 12, wherein the fused silica tool has a volume to surface area ratio of about 1.5 times larger than that of the ceramic matrix composite layup so that the fused silica tool dissipates heat at the same rate as the ceramic matrix composite layup.

14. The method of claim 1, wherein the fused silica tool has a volume to surface area ratio of about 1.5 times larger than that of the ceramic matrix composite layup so that the fused silica tool dissipates heat at the same rate as the ceramic matrix composite layup.

15. A method comprising
    treating a mold with a release agent,
    casting a tool comprising fused silica in the mold,
    placing a ceramic matrix composite layup on the tool, and sintering the ceramic matrix composite layup at a predetermined sintering temperature while the ceramic matrix composite layup is supported on the fused silica tool so that heat applied to the ceramic matrix composite layup is evenly distributed across the ceramic matrix composite layup.

16. The method of claim 15, wherein the predetermined sintering temperature is greater than or equal to about 1200 degrees Celsius.

17. The method of claim 15, wherein the step of casting the tool comprises:
adding a silica slurry to a mold of the tool,
vibrating the mold for a predetermined vibration period after adding the silica slurry to the mold,
allowing the silica slurry to set for a predetermined cast period to form a silica casting of the tool,
demolding the silica casting from the mold after the predetermined cast period, and
curing the silica casting to form the tool.

18. The method of claim 17, wherein curing the silica casting to form the tool comprises:
drying the silica casting at room temperature for two days,
applying heat at a first predetermined drying temperature to the silica casting for three days after drying the silica casting at room temperature,
increasing the temperature of the heat applied to the silica casting to a second predetermined drying temperature for a predetermined heating period after applying heat at the first predetermined drying temperature, and
applying heat at the second predetermined drying temperature for fifty hours after increasing the temperature to fully cure the silica casting.

19. The method of claim 15, wherein the tool has a volume to surface area ratio of about 1.5 times larger than that of the ceramic matrix composite layup so that the tool dissipates heat at the same rate as the ceramic matrix composite layup.

20. The method of claim 15, wherein the tool is formed to include truncated pyramids on a side of the tool that contacts the ceramic matrix composite layup.

* * * * *